United States Patent [19]

Cronshaw et al.

[11] 4,126,894
[45] Nov. 21, 1978

[54] MEMORY OVERLAY LINKING SYSTEM

[75] Inventors: David Cronshaw, Torrance; James R. Keddy, Huntington Beach; Jack E. Shemer, Los Angeles; William D. Turner, San Marino, all of Calif.

[73] Assignee: Xerox Corporation, Stamford, Conn.

[21] Appl. No.: 769,612

[22] Filed: Feb. 17, 1977

[51] Int. Cl.² .................. G06F 13/08; G06F 9/10
[52] U.S. Cl. .................................................. 364/200
[58] Field of Search ... 364/200 MS File, 900 MS File

[56] References Cited
U.S. PATENT DOCUMENTS

| | | | |
|---|---|---|---|
| 3,593,315 | 7/1971 | Patel | 364/200 |
| 3,652,804 | 3/1972 | Comella | 364/200 |
| 3,686,641 | 8/1972 | Logan et al. | 364/200 |
| 3,693,165 | 9/1972 | Reiley et al. | 364/200 |
| 3,729,712 | 4/1973 | Glassman et al. | 364/900 |
| 3,768,075 | 10/1973 | Reitsman et al. | 364/200 |
| 3,878,513 | 4/1975 | Werner | 364/200 |
| 3,900,834 | 8/1975 | Casey et al. | 364/200 |
| 3,972,026 | 7/1976 | Waitman et al. | 364/900 |
| 3,984,817 | 10/1976 | Barbour et al. | 364/200 |
| 3,988,719 | 10/1976 | Whitby et al. | 364/200 |
| 4,016,545 | 4/1977 | Lipovski | 364/200 |
| 4,025,904 | 5/1977 | Adney et al. | 364/200 |
| 4,027,288 | 5/1977 | Barton et al. | 364/200 |
| 4,038,643 | 7/1977 | Kim | 364/200 |
| 4,080,651 | 3/1978 | Cronshaw et al. | 364/200 |
| 4,080,652 | 3/1978 | Cronshaw et al. | 364/200 |

Primary Examiner—Mark E. Nusbaum
Assistant Examiner—Jan E. Rhoads
Attorney, Agent, or Firm—James J. Ralabate; Sheldon F. Raizes; Leonard Zalman

[57] ABSTRACT

A mapping arrangement for memory overlay wherein the address coordinates are referenced to a main serial memory. This main memory is partitioned into pages of equal size. An accelerator memory is concurrently loaded with a few pages representing a small portion of the main memory contents and is periodically overlayed with new memory contents on a page-at-a-time basis as the using system demands. During this overlay the fields of the accelerator memory are inscribed at corresponding main memory address coordinates together with code bits indicating whether certain memory fields go together and are therefore promoted as a single unit. The resulting effect is to cause an apparent increase in page size since more than one page is promoted as a consequence of a reference to a page not contained in the accelerator memory.

6 Claims, 4 Drawing Figures

MEMORY OVERLAY LINKING SYSTEM

BACKGROUND OF THE INVENTION

1. Field of the Invention

The present invention relates to memory mapping and more particularly to link and mapping pointers in a memory overlay system for maintaining order in reference sequences.

2. Description of the Prior Art

In many data processing applications the technique of expanding memory has been utilized in order to bring up strings of related data or programs from a slow and large bulk storage system to a higher rate accelerator store. One such technique of memory overlay has been described in an application Ser. No. 769,611, entitled "Memory Control Processor," now U.S. Pat. No. 4,080,651, issued on Mar. 21, 1978, assigned to the same assignee and filed concurrently herewith. In this overlay technique most addressing of memory is made by way of the coordinates of the main system and only in the event that that field or segment of main store is already overlayed into the accelerator store is the transformation of address made to the accelerator memory coordinate system. As is commonly recognized in the art the size of an accelerator store is typically cost limited and any overlay thereto is often performed according to some statistically optimized order. Thus in the aforementioned application the overlay occurs into least recently used segments of the accelerator memory. For purposes of organization the segments of accelerator memory are sized to correspond to the segment size of the main or bulk memory. In cases of disc this becomes a sector field which is commonly referred to herein as a memory page. Each page, in turn, includes a plurality of data words which depending on packing density and word size can be of any number. The same considerations supporting the least recently used page overlay technique also dictate that overlay occur in page sequences where related data stretches over more than one page. Similarly, destruction of data in the accelerator memory, referred to herein as the page buffer store, also often entails page strings or links, particularly where one page is of little utility without the associated other pages.

It is therefore the intent and purpose of the present invention to provide a system of pointers which both transforms the main memory referenced address into the corresponding page buffer store address and concurrently invokes the required linking sequences.

SUMMARY OF THE INVENTION

Accordingly it is the general purpose and object of the present invention to provide an address transformation system from a main memory referenced address system to a temporary or volatile accelerator memory system.

Other objects of the invention are to provide for logical linking of memory overlays which depend both on the linking of the overlayed and overlaying store.

Yet further objects of the invention are to provide a pointer and link mapping arrangement for use with a least recently used memory overlay technique or any other logical algorithm based on page usage history.

Briefly these and other objects are accomplished within the present invention by combining a least recently used memory overlay system, described at length in a concurrently filed application, Ser. No. 769,611, now U.S. Pat. No. 4,080,651, entitled "Memory Control Processor" and appended herein as Appendix A, with a map system which includes a pointer to the corresponding segment in the accelerator memory (or page buffer store) a status bit indicating if this segment or page is in the page buffer store, a page link bit invoking overlays of more than one page each time one of the pages in a chain is to be overlayed, and a tag bit setting aside selected page buffer store pages from the overlay process, in effect fixing these pages in the accelerator memory.

While there are many ways of physically implementing these functions the most convenient is to utilize a mapping RAM for this purpose. To accomplish these functions the address request is first filtered to isolate the page number bits out of an address containing both page and word coordinates. The page number is encoded in terms of the main memory coordinates and therefore serves as an address to a corresponding field in the RAM which contains the corresponding page address in the page buffer store if that page is already overlayed. In addition to this field each page number address also invokes a link field pointing to, (or indicating) all other related pages.

By this arrangement the link pointers may be dynamically altered according to the application or program executed. Furthermore, by expanding the size of the link field various levels of cross correlation with other pages can be accommodated. By this technique overlays or page swapping in statistically optimal sets can be achieved.

DESCRIPTION OF THE SPECIFIC EMBODIMENT

While the present invention can be practiced with various other memory overlay techniques it is best illustrated in association with an overlay technique based on a least recently used accelerator memory page algorithm described in an application entitled "Memory Control Processor." This illustrative example, however, is selected for purposes of disclosure only it being intended that other overlay systems utilize the same invention.

Figure 1:
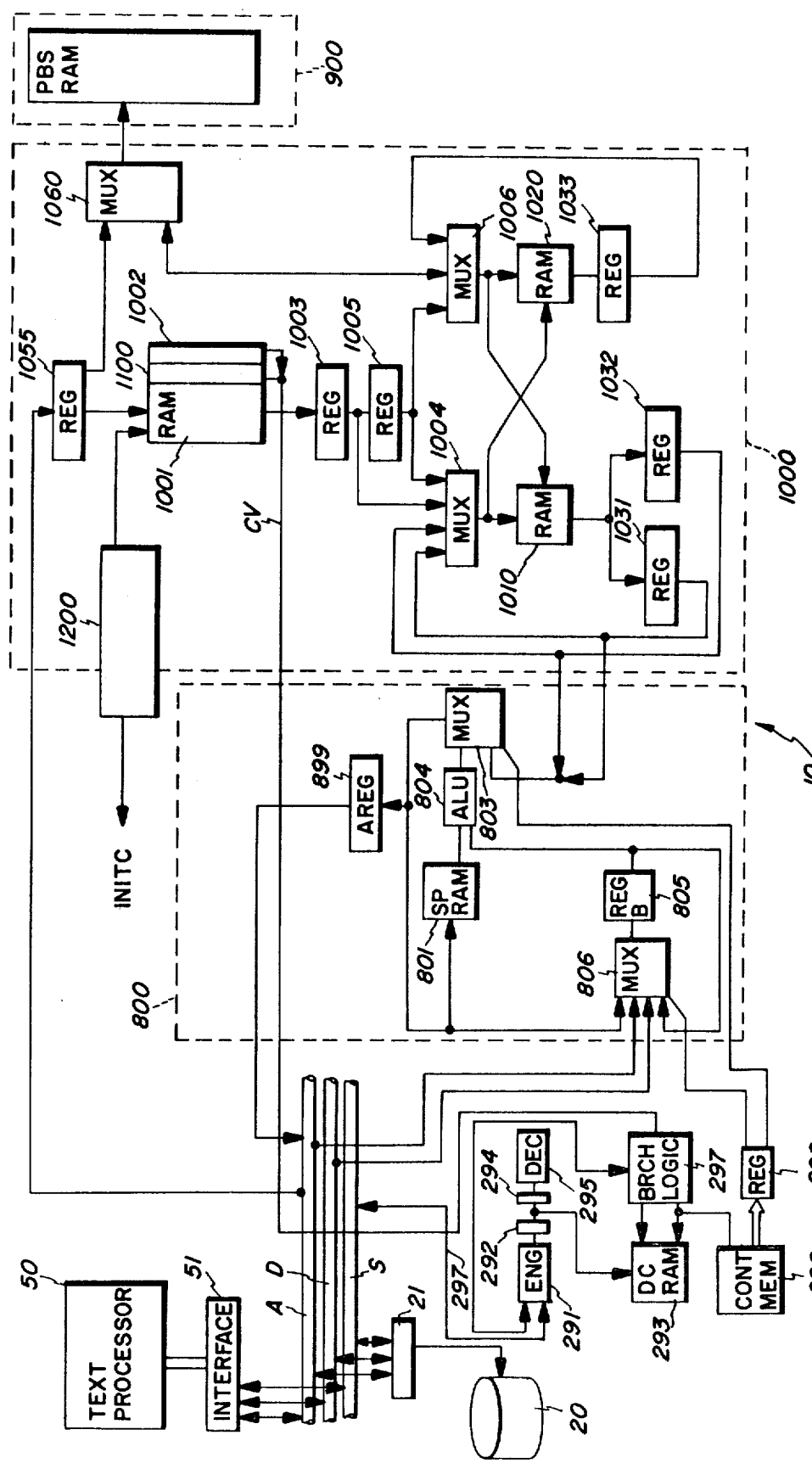
FIG. 1 is a block diagram of a data processing system adapted for use with the present invention.

As shown in FIG. 1 a data processing system generally designated by the numeral 10 comprises a main processor 50 tied across an interface 51 to a plurality of external or system buses A, D and S. Bus A performs the function of an address bus and is therefore structured to include the necessary leads to accommodate address words of desired bit width. Included in the system is a main or bulk memory shown herein by way of a disc storage 20 which, in turn, is associated with a disc controller 21. Disc 20 is exemplary only and any other bulk store like CCD (charge coupled device), bubble, or tape are subsumed thereunder. In order to simplify user operations it is intended to utilize the coordinates of disc 20 as the address coordinates imposed on bus A. Furthermore, in order to accelerate the various memory access functions performed by the main processor 50 the system 10 includes a page buffer store system 900 operating as a random access accelerator memory which, because of its limited size, is necessarily overlayed by new data from the disc 20. This overlay is accomplished by way of a memory controller 800 in combination with an overlay system 900 accommodating a "least recently used" overlay technique described in detail in the aforementioned application. The controller stage 800 cooperates with a priority logic system 200, integrating various competing requests. In the overlay stage 1000 the address bus A is filtered for page number information by a register 1055 with a selected set of more significant bits thereof being applied as an address input to a mapping RAM 1001. It is the field arrangement or data distribution within this RAM 1001 that provides the basis for the present invention.

Following the general system layout RAM 1001 outputs selected field positions to a Current Page Number (CPN) register 1003 which identifies the correlative page location in the accelerator memory 900 if that page has already been overlayed or inscribed in this memory. The prior contents of register 1003 are concurrently transferred to a Youngest Page Number (YPN) register 1005, registers 1003 and 1005 being interleaved by way of two multiplexers 1004 and 1006 to modify the linking sequence in a corresponding pair of linking RAMS's 1010 and 1020. It is the function of RAM's 1010 and 1020 to establish a linking sequence from the youngest to the oldest page in order to identify pages having the least recent usage for overlay.

The above overlay technique is exemplary only. It is to be understood that other overlay systems are compatible with the invention herein. Furthermore, additional details of the cooperative logic may be had from the above referenced application which, in selected parts, is attached herewith as Appendix A.

Accordingly the above description RAM 1001 necessarily includes the address space corresponding to the address width of disc 20. Furthermore for each address RAM 1001 must also include the necessary field for transformation into page buffer store coordinates. By expanding the field width of RAM 1001 the above described implementation of the present invention can be carried out.

Figure 2:
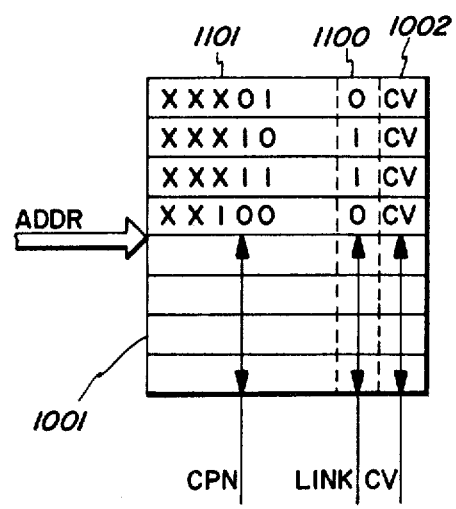
FIG. 2 is a diagram of an inventive field breakdown in a random access memory.

More specifically as shown in FIG. 2 RAM 1001 includes a five bit field 1101 inscribed with the corresponding address in the accelerator memory 900. For the purposes herein the accelerator memory 900 is structured to contain 32 "pages" (sector fields of disc 20, for example and five bits for mapping are therefore adequate. Should larger accelerator memory be desired, fields 1101 can be correspondingly increased. Arranged along fields 1101 is a corresponding field 1100 shown herein as a single bit field. It is this field 1100 that connects the various main memory segments into larger units. During initialization of the system the whole address space of the main memory is cycled through and field 1100 is inscribed with a logical high if the prior main memory address goes with this page address. Thus, for example, the address in main memory 20 corresponding to the address XXX10 in field 1101 may include a "1" in field 1100. Similarly accelerator coordinate XXX11 may include a "1" in field 1100. Coordinate XX100 terminates the chain by an "0" in field 1100. Accordingly if fields XXX01, XXX10 and XXX11 are to be overlayed with new data such overlay must occur in a group terminated before the coordinate XX100.

It is to be noted that the above coding of field 1100 is done by reference to the real address ADDR and therefore does not depend on the corresponding existence of some data in the accelerator memory. Should a field not in the accelerator memory be called for a field 1002 issues a signal CV (Contents Valid) which is fed to a branch unit 297 in the priority logic unit 200. Branch unit 297 then alters the address sequence in the priority logic to initiate an overlay. Concurrently the next sector position (ADDR) is inspected for the presence of the signal LINK, indicating that this next sector is to be brought up in sequence after the prior sector is overlayed.

Figure 3:
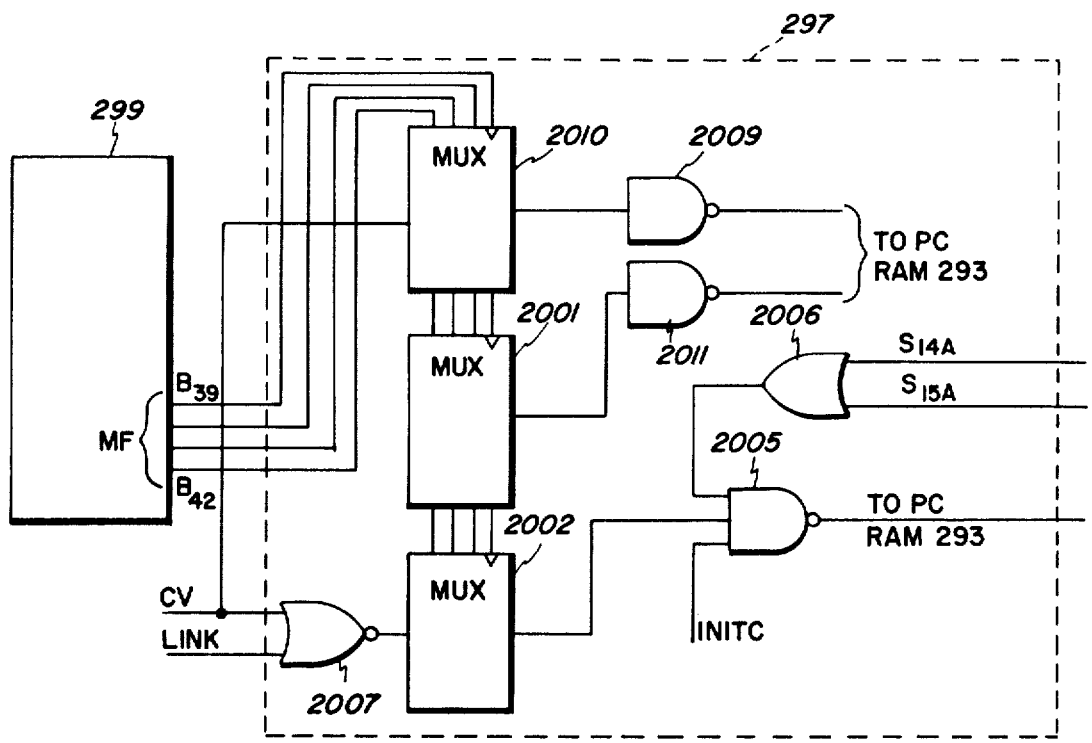
FIG. 3 is a logic diagram of a branch stage rendered operative by the present invention.

The foregoing signals CV and LINK are brought out to the branch logic 297. As shown in FIG. 3 a set of multiplexers 2001, 2002 and 2010 select various input signals according to a four bit instruction code MF from the output of the logic stage 200. For a more detailed explanation of stage 200, reference should be had to Appendix A wherein selected parts of a concurrently filed application entitled "Memory Control Processor" are set forth. More specifically code MF appears at bit positions $B_{39}$-$B_{42}$ of 48 bit instructions register 299 and is applied as a three bit code (8 input select code on bits $B_{40}$-$B_{42}$) to the data select terminals of these multiplexers. Bit $B_{39}$ is applied to the strobe terminals to thus operate as a chip enable signal. In this context multiplexers 2001, 2002 and 2010 comprise two of many multiplexers. The data outputs of multiplexer 2002 is collected in a NAND gate 2005 which also receives a signal INITC indicating the end of any start-up sequences rendered through an initialization stage 1200 (in FIG. 1) and the output of an OR gate 2006 which collects the acknowledging signals $S_{14_A}$ and $S_{15_A}$. With this arrangement, the output of gate 2005 produces a signal of corresponding polarity as the least significant bit input to the PC RAM 293.

Signals CV and LINK are combined at a NOR gate 2007 to provide a low level AND to one input of multiplexer 2002. At the same time the uninverted signal CV is applied to the same data terminal of multiplexer 2010. Multiplexer 2010 will inhibit, through a NAND gate 2009 branching in the PC RAM 293 whenever the requested page is in the page buffer store. If not the output of multiplexer 2002 is passed to the NAND gate 2005 to initiate a branch to a linking sequence. It is to be noted that it is the next field to the one addressed in RAM 1001 that provides this link function.

Figure 4:
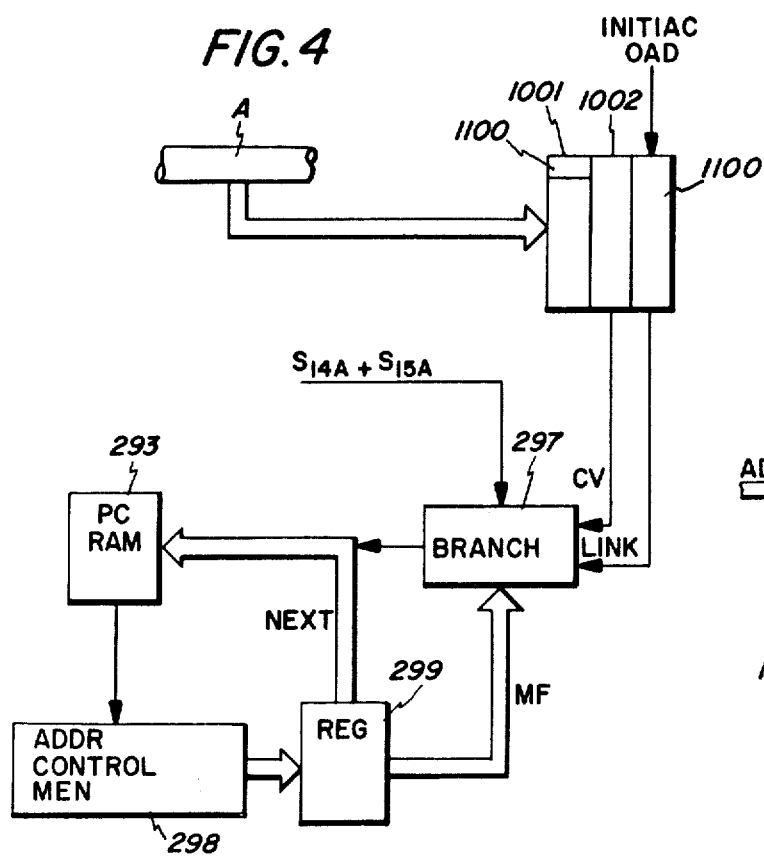
FIG. 4 is a data flow diagram of a control circuit operating according to the present invention.

To illustrate this function reference should be had to FIG. 4. In this figure the data flow is illustrated for the loop around the link signal. As a memory segment is addressed on bus A both the CV signal and the LINK signal are brought out from the map RAM 1001. These signals indicate the absence of requested data in the accelerator memory and the predetermined linking sequence of main memory segments. This is then utilized in the branch stage 297 to either branch to a next field overlay or to terminate overlay. Accordingly it is the LINK code in the trailing field that dictates a linked overlay with the prior field.

It is to be noted that the foregoing description deals with a single bit pointer. By simple expansion of the bit width of the LINK signal and corresponding selection of multiplexers in branch unit 297 linking subsets can be accommodated which select link sequences depending on the field first entered. For example, by setting a two bit LINK signal four different length sequences can be invoked by the foregoing implementation.

This linking arrangement is particularly suited to predictive overlay into memory space having lowest recent usage.

Obviously many modifications and variations to the above disclosure can be made without departing from the spirit of the invention. It is therefore intended that the scope of the invention be determined solely on the claims appended hereto.

We claim:

1. An overlay linking system for use in data processing applications, comprising:
    a main processor adapted to execute program instructions selected by a user and to produce address codes;
    a memory system connected to said main processor including a main memory having stored in uniquely addressable locations selectable by said address codes data or instruction codes and an accelerator memory for storing such ones of said data or instruction codes as are selected by ones of said address codes;
    overlay means disposed between said main and accelerator memories for advancing other ones of said data or instruction codes from said main memory to said accelerator memory in response to receiving other ones of said address codes or a link signal and for returning said ones of said data or instruction codes back to said main memory; and
    linking means including a random access memory having addressable fields connected for concurrent selection by said other ones of said address codes, each said field including a link code indicative of predetermined combination of sets of said other ones of said data or instruction codes for producing said link signal to said overlay means.

2. In a data processing system including a main processor producing address codes, a main memory having stored therein a plurality of data or instruction codes in uniquely addressable sets selectable by said address codes, an accelerator memory connected to communicate with said main processor having stored therein selected ones of said sets, and a memory control processor connected to said main and accelerator memories for periodically exchanging ones of said sets for other ones of said sets selected by said address codes between said main and accelerator memories, the improvement comprising:
    a programmable memory operatively connected to said main processor and including a plurality of corresponding uniquely addressable fields each said field being selected by said address code current with a corresponding one of said sets, each said field further including linking codes indicative of predetermined combination of said sets; and
    linking means connected to receive said link codes for controlling said memory control processor to select said other ones of said sets in said predetermined combinations, said memory control processor including a microprogram store, a program counter for advancing said microprogram store, overlay means controlled by said microprogram store and branch means connected to said program counter for modifying the advancement of said microprogram store according to said linking codes.

3. Apparatus according to claim 2 wherein:
    said programmable memory further includes status codes indicative of the presence of said sets in said accelerator memory said status codes being connected to initiate said program counter when a set addressed by said main processor is not in said accelerator memory.

4. Apparatus according to claim 3 wherein:
    said overlay means includes logic means for identifying said sets having the least recent usage from amongst said selected ones of said sets.

5. In a data processing system including a main memory storing data in page increments, each page being uniquely selectable by an address code, an accelerator memory, a processor conformed to execute programs and sequences and to produce said address codes according to said execution, and an overlay system connected between said main memory and said accelerator memory and adapted to receive said address codes for transferring from said main memory to said accelerator memory one of said page increments of data when said processor produces one of said address codes, the improvement comprising:
    linking means connected to receive said one address code from said processor and including a plurality of storage fields in sequential order, one of said fields being addressable by said one address code and other ones of said fields being addressable by other ones of said address code, each said field including one of a plurality of link codes, and advancing means connected between said main memory and said accelerator memory and adapted to receive said link codes in the other ones of said storage fields for overlaying other ones of said page increments when said binary codes in said other ones of said storage fields are equal to said binary code in said one storage field.

6. Apparatus according to claim 5 wherein: said advancing means includes sequencing means for selecting said other ones of said storage fields according to said sequential order thereof.

* * * * *